W. C. HOOD.
CURRENT TESTING DEVICE FOR ELECTRIC BATTERIES.
APPLICATION FILED MAR. 20, 1908.
930,474.
Patented Aug. 10, 1909.
2 SHEETS—SHEET 1.
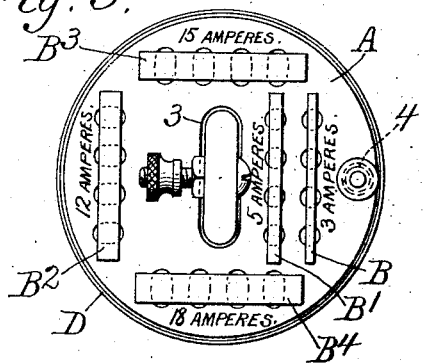
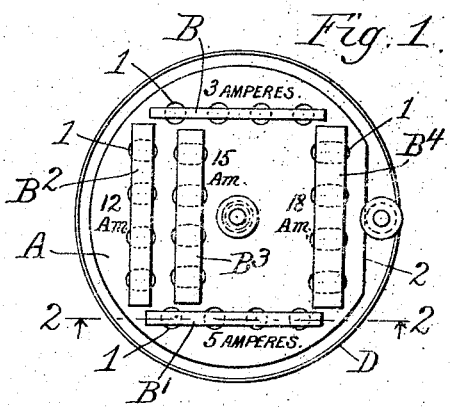
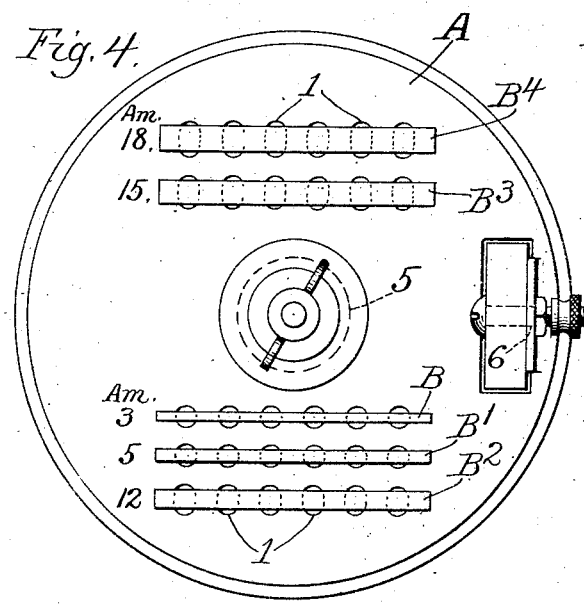
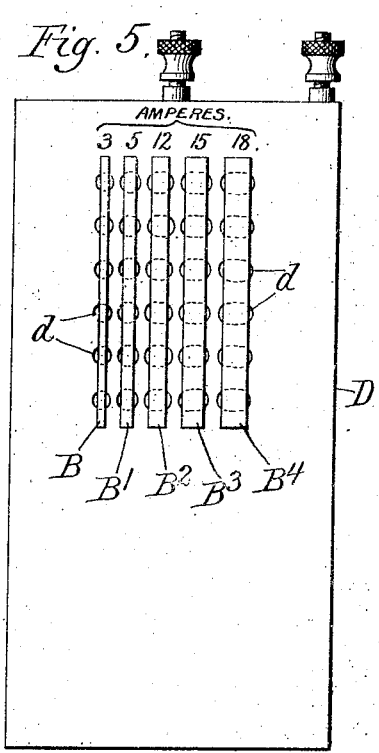
Witnesses,
Edward F. Wray
Julia S. Abbott
Inventor.
William C. Hood.
by Burton & Burton
his Atty's.

W. C. HOOD.
CURRENT TESTING DEVICE FOR ELECTRIC BATTERIES.
APPLICATION FILED MAR. 20, 1908.
930,474.
Patented Aug. 10, 1909.
2 SHEETS—SHEET 2.
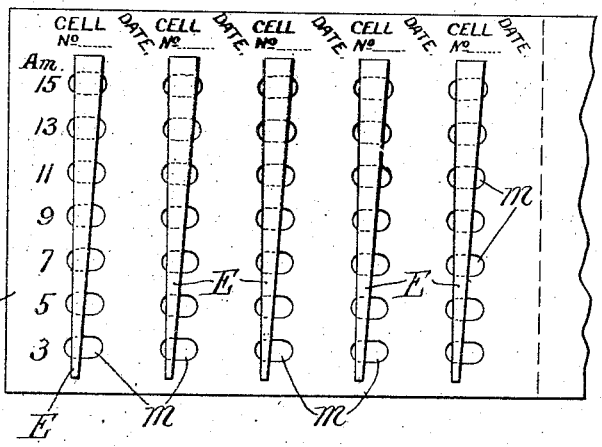
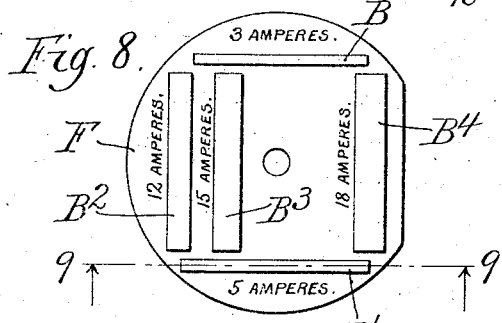
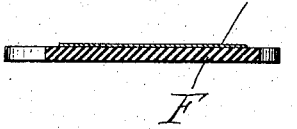
Witnesses.
Edward T. Wray.
Julia S. Abbott
Inventor.
William C. Hood
by Burton & Burton
his Attys.

UNITED STATES PATENT OFFICE.

WILLIAM C. HOOD, OF CHICAGO, ILLINOIS, ASSIGNOR OF ONE-HALF TO CHARLES W. DIETRICH, OF CHICAGO, ILLINOIS.

CURRENT-TESTING DEVICE FOR ELECTRIC BATTERIES.

No. 930,474.  Specification of Letters Patent.  Patented Aug. 10, 1909.

Application filed March 20, 1908. Serial No. 422,217.

*To all whom it may concern:*

Be it known that I, WILLIAM C. HOOD, a citizen of the United States, residing at Chicago, in the county of Cook and State of Illinois, have invented new and useful Improvements in Current-Testing Devices for Electric Batteries, of which the following is a specification, reference being had to the drawings forming a part thereof.

The purpose of this invention is to provide a cheap, simple and easily applied substitute for an ammeter for ascertaining at any time the current furnished, or which can be furnished, by an electric battery or cell, and it is intended particularly for application to dry cells, though not limited to such use.

The invention consists of a device having the characteristics shown in the drawings and hereinafter described, as indicated in the claims.

In the drawings:—Figure 1 is a plan view of a device embodying my invention, of convenient form for application to common forms of cylindrical dry cells. Fig. 2 is a section at the line 2—2 on Fig. 1. Fig. 3 is a plan view of a slightly modified form of the device suitable for application to a slightly different form of cell. Fig. 4 is a plan view of a third form of the device adapted for a cell or battery of different shape and construction. Fig. 5 is an elevation of a dry cell having the inclosing pasteboard envelop provided with devices embodying my invention. Figs. 6 and 7 are plan views of cards adapted to be assembled in books provided with the features and elements constituting my invention. Fig. 8 is a plan view of a device in shape and form adapted to be applied to a cell of the same form as the device shown in Fig. 1, but having a modified construction in respects other than its mere form for fitting the cell. Fig. 9 is a section at the line 9—9 on Fig. 8.

In all the forms in which my invention is represented in the drawings it comprises a disk or plate of comparatively or moderately insulating material, and in all the forms except that shown in Fig. 8 this disk or plate, A, being of material which is moderately and not highly insulating,—as, for example, ordinary cardboard or fiber-board or wood veneer,—is provided with rows of perforations, 1. Across these perforations there are secured to the outer face of the disk or plate, A, strips of tin-foil, B, B¹, B², B³, B⁴, of different widths or thickness. The variations in thickness are not represented in the drawings, because the actual variations would be inappreciable, and for the same reason strips varying in thickness are not so convenient for the purpose because not so readily distinguishable as strips varying in width. Nevertheless it will be seen that the principle of operation would be unchanged and only the convenience of the device affected by employing strips varying in thickness, or accumulating them one upon another in varying numbers, across the different rows of holes. The cross sections of the different strips, whether varying in thickness or width, are such that the several strips may be melted by passing through them across the apertures correspondingly varying electric currents. The narrow strip, B, for example, may be of such cross section that upon the application to it, at opposite sides of any one of the apertures over which it is laid, of the two terminal wires of a cell to be tested, a current of three amperes will melt it where it is extended across the aperture. The strip, B¹, may be of such cross-section as to be melted under similar circumstances by a current of five amperes. The strip, B³, may be of such cross-section as to require fifteen amperes to melt it, and the strip, B⁴, may be still wider or thicker, requiring eighteen amperes.

In order to determine how much any cell to be tested has run down, or how much current it is still able to develop, the terminal wires may be applied at opposite sides of any aperture, first on the widest or heaviest strip, B⁴. If it does not melt the strip at the aperture at the opposite sides of which the wires are applied the current is below eighteen amperes. By applying it successively to the other strips in the order of their diminishing width until a strip is found which the current will melt, the condition of the cell as to exhaustion or strength may be determined within a margin of accuracy depending upon the number of these strips and the differential between their successive cross sections. It will be obvious that any number of strips of graduated widths may be similarly applied, according to the space available for the purpose on a disk of convenient size for application to the particular cell for which it was intended. The number chosen for illustration is of course not significant. The purpose of arranging each strip of uniform width to extend across a plurality of apertures is to make it possible to test the same cell several times during the time that its strength is between the limits of resistance of each two consecutive strips.

The difference between the forms shown in Figs. 1, 3 and 4 is only mechanical, each of these forms being, in respect to shape and position of the apertures, adapted for securing it to a particular form of cell. As a matter of practical convenience it is desirable that the device should be attached to the cell without requiring any special appliance for the purpose, and the most convenient means of accomplishing this is to secure it by one or the other of the binding screws. When a cell has a binding screw at the center, the form shown in Fig. 1 is convenient, the other binding screw in such case being usually at the margin, where it is accommodated by cutting away a segment of the disk, as at the line 2 on Fig. 1. When the carbon element of the cell is extended out through the cap at the center, the form shown in Fig. 3 is more convenient; the oblong aperture, 3, at the center being designed to accommodate the carbon, while the aperture, 4, affords means for securing the disk to the binding screw connected with the other element of the cell. The form of the device shown in Fig. 4 is adapted for a familiar form of liquid cell, the aperture, 5, being designed to admit the zinc element, the device being secured by the binding screw on the carbon element taking through the aperture.

In Fig. 5 the pasteboard sheath, D, which is commonly applied in a spiral form to inclose familiar types of dry cells, is utilized for the same purpose as the disk shown in the previous figures, the apertures, $d$, being formed in convenient rows and crossed by the tin-foil strips, B, $B^1$, $B^2$, $B^3$, $B^4$, precisely as in the case of the disks so as to be used in testing a cell in the same manner as above described.

Instead of a plurality of strips of different width or thickness, there may be employed tapered strips, as shown in Fig. 6. This figure represents a testing card, M, which is shown without regard to the means of applying it or securing it to a cell, this not being necessary, but only a convenient, incident of the construction or use, the tapered strips, E, being extended each across a row of holes, $m$, in the card. The only reason for providing a plurality of tapered strips and a plurality of rows of holes across which they extend is to afford convenience for making more than one test at the same strength of the battery.

In one form of the invention having convenience for certain purposes, testing cards, M or N, are each provided with apertures, $m$, $n$, crossed by strips of tin-foil, either of different widths, as in the form of device in Fig. 1, or tapered strips as in Fig. 6. A number of these cards being assembled in a book provide means for one having occasion to make frequent tests, to do so readily and keep a record opposite each of the apertures of the particular cell or battery tested.

In Figs. 8 and 9 there is shown a modification of the invention in which, by employing a base which is substantially perfectly insulating, the apertures may be dispensed with; the base, F, in this construction may be taken to be mica, glass, hard rubber or any other substantially perfect insulator. By using a card of such material as fiber board, strawboard or the like, which is of comparatively high insulating power, and securing the tin-foil strips to such base by a sufficiently thick layer of rubber cement or other insulating cement which when hardened constitutes the real base on which the tin-foil rests, the same effect is produced as by employing a perfectly insulating base; and the construction shown in Figs. 8 and 9 may be understood as including such a structure. The common forms of rubber cement applied to pasteboard, for example, will saturate the pasteboard for a sufficient depth, so that, including the layer of cement remaining on the surface of the pasteboard in addition to that which penetrates it, the resulting composite structure, consisting of pasteboard and cement, will be rendered practically a perfect insulator.

I claim:—

1. A battery-current-testing device consisting of an insulating support and metal foil mounted thereon of graduated widths at different points.

2. A battery-current-testing device consisting of an insulating base having rows of apertures and metal foil extending across the apertures having different widths at different apertures.

3. A battery-current-testing device consisting of an insulating base having a multiplicity of apertures, and metal foil applied to the base bridging the apertures, the width of the foil being different at different apertures.

4. A battery current-testing device consisting of an insulating base and a plurality of insulated strips of metal foil of graduated widths mounted directly thereon.

5. A battery current-testing device consisting of a supporting base and a plurality of insulated strips of metal foil of graduated widths mounted thereon.

6. A battery-current-testing device consisting of an insulating base having rows of apertures in combination with metal foil strips of graduated widths mounted on the base extending across the apertures of the respective rows.

7. A battery-current-testing device consisting of a disk of insulating substance apertured for securing to one of the battery binding posts, and having mounted upon its exposed surface metal foil having graduated widths.

8. A battery-current-testing device consisting of a disk of insulating material apertured for attachment to one of the battery binding posts, such disk having a plurality of apertures, and metal foil of graduated widths secured to the disk bridging such apertures.

9. A battery-current-testing device adapted for cylindrical dry cells consisting of a circular disk corresponding in diameter to the end of the cell apertured for securement to one of the battery binding posts having another aperture to admit the other binding post or battery pole, and having mounted upon its exposed face a plurality of metal foil strips of graduated widths.

10. A battery-current-testing device for dry cells consisting of a disk of insulating material corresponding to the dimensions of the end of the cell, having apertures for the binding posts or battery poles and adapted to be secured to one of the binding posts at such aperture, such disk having rows of other apertures, and metal foil of graduated widths secured to the exposed face of the disk bridging such apertures.

In testimony whereof, I have hereunto set my hand, in the presence of two witnesses, at Chicago, Illinois, this 17th day of March, 1908.

WILLIAM C. HOOD.

In the presence of—
JULIA S. ABBOTT,
M. GERTRUDE ADY.